United States Patent Office 3,292,853
Patented Dec. 20, 1966

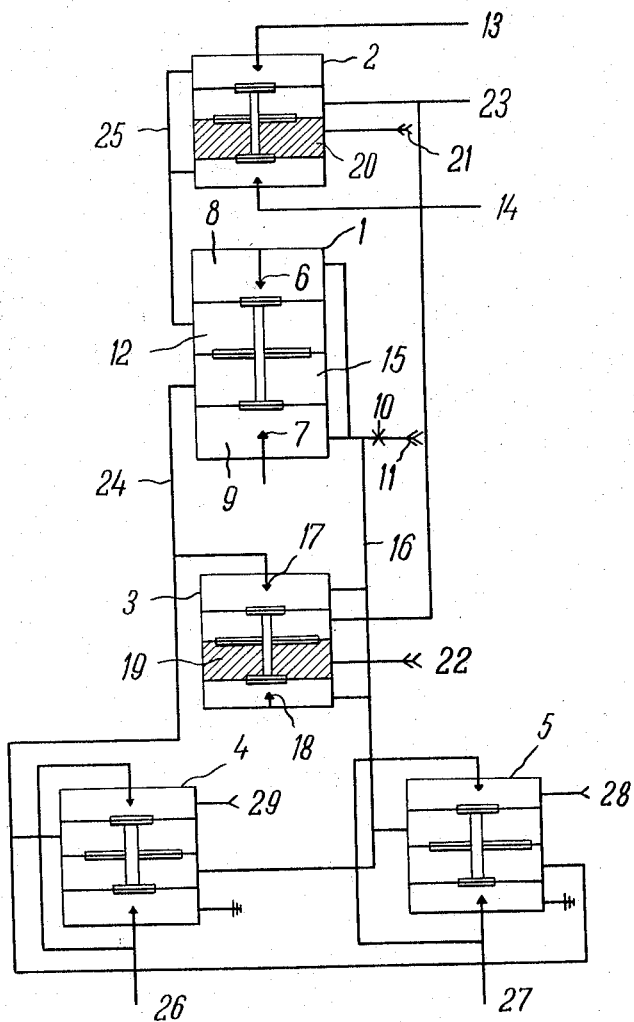

3,292,853
COMPARATORS OF PNEUMATIC ANALOG SIGNALS
Robert Jurjevich Fedoseev, Moscow, U.S.S.R., assignor to Nauchno-Issledovateljsky Institute Teploenergeticheskogo Priborostroenija, Moscow, U.S.S.R.
Filed Oct. 16, 1964, Ser. No. 404,380
1 Claim. (Cl. 235—200)

The invention relates to control system, and more particularly, to comparators of pneumatic analog signals.

There are known comparators of pneumatic analog signals, e.g. four-chamber three-diaphragm relays provided with two jets positioned perpendicular to the planes of the diaphragms at both sides of the diaphragm set. The diaphragms used in relays of this type are rigidly connected with each other forming four chambers in combination with a housing. The extreme diaphragms are of the same diameter which is smaller than that of the middle diaphragms. The extreme chambers are both connected with each other and with the outlet air line. One of the jets is connected with the supply line and the other one with the ambient air. One of the middle chambers is connected to the line of the first signal being compared and the second chamber to the line of the second signal to be compared. However, the use of such relays in multi-channel control systems is limited by certain difficulties, namely by the necessity and by the need for manufacturing the relay elements with a high grade of accuracy, of thoroughly adjusting the relays and taking into account temperature errors.

There are also known devices for the comparison of two signals, comprising two bellows, a lever connecting the latter, and a jet which is opened or closed depending on the position of the lever. The disadvantage of such devices is the necessity to adjust the length of the lever arms connecting the bellows, as well as to adjust the position of the jet.

An object of the present invention is to provide a comparator of pneumatic analog signals employing the known elements, said comparator being characterized by a higher accuracy of comparison.

It is another object of the invention to provide a comparator making it possible to reduce temperature errors.

It is a further object of the invention to provide a comparator which is greatly reliable in operation.

A still further object of the invention is to simplify the process of adjusting the comparator while in manufacture and to avoid the need for readjustment while in service.

Yet another object of the invention is to widen the limits of tolerances when producing comparator elements.

According to the above mentioned and other objects of the invention there is provided a novel device for comparison of pneumatic analog signals, said device comprising a four-chamber three-diaphragm two nozzle comparison element with a rigid center portion, two nozzle three-diaphragm pneumatic inlet valves, a pressure resistor and two two nozzle outlet valves.

One of the chambers of the comparison element (the measuring one) is connected with air inlet channels through the first two nozzle inlet valve having two control chambers, one of which chambers is connected with the air line of the control pressure and the other with the back pressure source. The second chamber of the comparison element is connected with one jet of the second two nozzle inlet valve, the jet chambers of which are connected with the outlet of the comparison element. One of the control chambers of this valve is connected to the back pressure source, and the second to the line of the control pressure.

The second chamber of the comparison element is also connected with the control chambers of the two nozzle outlet valves. The other control chambers of these valves are connected with the outlet of the comparison element, and the air lines of their jets form the outlets of the comparator.

Other objects and advantages of the present invention will be more apparent from the following detailed description of an embodiment thereof with reference to the sole figure of the drawing wherein said embodiment is shown diagrammatically.

The comparator comprises a conventional three-diaphragm two nozzle comparison element 1, a pair of two nozzle inlet valves 2 and 3, and two supplementary valves 4 and 5 of the outlet.

The air line of jet 6 of comparison element 1 being shut off, the air line of another jet 7 is connected with ambient air. Chambers 8 and 9 under the diaphragms at jets 6 and 7 are connected with each other and through pressure resistor 10 with supply line 11. The first measuring chamber 12 is connected through valve 2 either with air inlet line 13 of a first pneumatic signal hereinafter referred to as $P_1$ inlet or with air line 14 of a second pneumatic signal hereinafter referred to as $P_2$ inlet. The second measuring chamber 15 of the comparison element is connected through jet 17 of valve 3 with air line 16 of the outlet of comparison element. Second jet 18 of this valve is closed. A constant back pressure through air lines 22, 21 is delivered to chamber 19 of valve 3 and to chamber 20 of valve 2, the pressure in chamber 19 being higher than that in chamber 20.

The pressure in air line 23 may be higher or lower than the pressure in lines 21 and 22. Air line 24 is connected with outlet valves 4 and 5. Position of the diaphragm sets of valves 2 and 3 depends upon the control pressure of the transition from one operation duty to another in line 23.

At the beginning of the comparator operation the control pressure is delivered to line 23. Line 13 is connected with line 25, while line 16 is connected through valve 3 with line 24 and with outlet valves 4 and 5. This operation duty may be called the pressure follow-up duty in line 13.

If the control pressure in line 23 is reduced to zero, valve 3 will be the first to operate, as the back pressure in chamber 19 of this valve is higher than the pressure in chamber 20 of valve 2.

A shift in time is required first of all to store the pressure in chamber 15, and then to enable valve 2 to occupy another position and to connect chamber 12 with line 14 having disconnected it from line 13. If pressure $P_2$ inlet is equal to pressure $P_1$ inlet, the equilibrium of the diaphragm set of comparison element 1 will not be upset and the pressure in line 16 at the outlet of the comparison element will not change. As the value of pressures in lines 24 and 16 is the same, pressure $P_1$ outlet as well as pressure $P_2$ outlet at outlets 26 and 27 of valves 4 and 5 will be equal to the supply pressure. If pressure $P_2$ inlet is not equal to pressure $P_1$ inlet, then it will be sufficient for a difference in their values to exceed the value of the nonresponsive range of comparison element 1 for the diaphragm set of the latter to assume its extreme position. In this case jet 7 will either be opened or closed. When pressure $P_2$ inlet is higher than pressure $P_1$ inlet, jet 7 will be closed and the pressure in line 16 will rise up to the value of the supply pressure.

At outlet 26 of valve 4 pressure $P_1$ outlet will be equal to zero, and at outlet 27 of valve 5 pressure $P_2$ outlet will be equal to the value of the supply pressure. When pressure $P_2$ inlet is lower than pressure $P_1$ inlet, jet 7 of comparison element 1 becomes open and the pressure in line 16 will become lower than that in line 24, which will cause a change in the position of the diaphragm set of valve 5, whose outlet line becomes connected with the ambient air and disconnected from supply line 28. At outlet 26 of valve 4 pressure $P_{1\,outlet}$ will be equal to supply pressure in line 29, and at outlet 27 of valve 5 pressure $P_{2\,outlet}$ will be equal to zero.

Thus, the comparator operates first as a follow-up system, the followed-up pressure with an error in this case being stored in the comparison element, and then the comparator starts to operate in the duty of comparison proper.

The comparator device is effective therefore to periodically compare the analog signals fed into the device via lines 13 and 14, as the control pressure varies in line 23. In other words, the device is used to determine whether one of the signals is greater than the other, or whether they are equal.

Basically comparator operates under two types of conditions. The first type occurs when the control pressure in line 23 is maximum, and line 13 is connected via valve 2 to line 25 and chamber 12 of comparison element 1 operating under these conditions so that its output pressure in line 16 substantially equals its input pressure in line 25, that is it corresponds to the pressure of the first analog signal compared. These operating conditions are achieved by connecting chamber 15 via line 24 and nozzle 17 of valve 3 to line 16. In steady state operation the membranes of comparison element 1 are subjected to balanced forces.

Since the pressure in lines 24 and 16 is the same, the pressure in lines 26 and 27 is equal to the supply pressure since they are respectively connected to lines 29 and 28.

When the pressure drops to zero in lines 23, valve 3 operates to shut its nozzle 17 and seal off line 24, thus preserving its pressure at a constant level. This causes valve 2 to operate and connect line 25 with line 14 of the second analog signal compared.

These operating conditions are in fact established during the comparison process. When the pressure in line 14 equals that in line 13, the balance of forces acting on the membranes of the comparison element 1 does not change and as a result the pressure in line 16 does not alter, the pressure in lines 26 and 27 remains equal to the supply pressure value, thus indicating the equality of the analog signals compared.

If the pressure in line 14 exceeds that in line 13, the balance of forces acting on comparison element 1 is disturbed thus causing nozzle 7 to close and the pressure in line 16 to rise to the supply pressure value. As a result valve 4 operates and its output line 26 is shut off from supply line 29 and opens to the atmosphere, that is the pressure in line 26 drops to atmospheric air pressure, thus reflecting the fact that the pressure in line 14 exceeds that in line 13.

If the pressure in line 14 is below that in line 13, the balance of forces acting on the membranes of comparison element 1 is also disturbed, causing nozzle 7 to open and the pressure in line 16 to drop to that of atmospheric, resulting in the operation of valve 5, whose output line 27 is shut off from supply line 28 and connected to the atmosphere. In other words, the pressure in line 26 drops to atmospheric, thereby indicating that the pressure in line 14 is below that in line 13.

Valves 2, 3, 4 and 5 thus serve the following purpose. Valve 2 is utilized to connect chamber 11 of comparison element 1 to either line 13 of the first comparable signal, or line 14 of the second comparable signal. The valve is switched over by a command fed from outside via line 23. Valve 3 is used under the first type operating conditions to connect line 16 to line 24 and to seal off line 24 under the second type operating conditions. Valve 3 is switched over by a command fed via line 23.

Valves 4 and 5 are employed to generate signals at the device output depending on the differential pressure in lines 24 and 16, as described above.

While the present invention has been described in connection with the preferred embodiment thereof, it is to be understood that many changes and variations may be made without departing from the spirit and scope of the invention, by one skilled in the art and, accordingly, all such changes and variations are considered to be falling within the scope of the invention if defined by the appended claim.

What is claimed is:

A device to compare pneumatic analog signals comprising a four-chamber three-diaphragm two nozzle comparison element with a rigid center portion connecting the diaphragms and thereby forming a diaphragm set, two chambers of which are measuring chambers; an air pressure resistor; two four-chamber three-diaphragm two nozzle inlet air valves each consisting of two control chambers, one of which control chambers is connected with a control pressure line and the other with a back pressure supply source; the first of said inlet valves having jet chambers connected with each other and with respective inlet lines of pneumatic signals, said chambers being connected with one of said measuring chambers of said comparison element; the second of said inlet valves having jet chambers connected with the outlet of said comparison element and through the air pressure resistor with a supply line; two four-chamber three-diaphragm two nozzle outlet valves, each of the latter said valves consisting of two control chambers one of which chambers is connected with the outlet of the comparison element and the other one with the other measuring chamber of said comparison element, said other measuring chamber being also connected with the second inlet valve, the air lines of the jets of each said outlet valve being interconnected with one another thereby forming the outlets of the comparator.

No references cited.

RICHARD B. WILKINSON, *Primary Examiner.*

T. J. ANDERSON, *Examiner.*